(12) United States Patent
Raizen et al.

(10) Patent No.: US 8,977,787 B1
(45) Date of Patent: Mar. 10, 2015

(54) MANAGEMENT OF PATH OPERATING MODE TRANSITIONS IN MULTIPATHING HOST COMPUTER

(75) Inventors: Helen S. Raizen, Jamaica Plain, MA (US); Hitesh P. Trivedi, Cambridge, MA (US); Robert J. Pellowski, Ledyard, CT (US); Jimmy K. Seto, Wakefield, MA (US)

(73) Assignee: EMC Corporation, Hopkinton, MA (US)

( * ) Notice: Subject to any disclaimer, the term of this patent is extended or adjusted under 35 U.S.C. 154(b) by 348 days.

(21) Appl. No.: 13/535,752

(22) Filed: Jun. 28, 2012

(51) Int. Cl.
*G06F 3/00* (2006.01)
*G06F 3/06* (2006.01)

(52) U.S. Cl.
CPC ................ *G06F 3/0635* (2013.01)
USPC .................. 710/38; 710/19; 710/74

(58) Field of Classification Search
None
See application file for complete search history.

(56) References Cited

U.S. PATENT DOCUMENTS

| | | | |
|---|---|---|---|
| 6,802,021 B1 * | 10/2004 | Cheng et al. | 714/4.11 |
| 7,130,909 B2 * | 10/2006 | Yamashita et al. | 709/226 |
| 7,307,948 B2 * | 12/2007 | Infante et al. | 370/225 |
| 7,337,350 B2 * | 2/2008 | Mimatsu et al. | 714/4.4 |
| 7,668,981 B1 * | 2/2010 | Nagineni et al. | 710/38 |
| 8,352,653 B2 * | 1/2013 | Fang et al. | 710/74 |
| 8,799,608 B1 * | 8/2014 | Raizen et al. | 711/168 |
| 8,868,805 B2 * | 10/2014 | Takakura et al. | 710/74 |
| 2003/0137932 A1 * | 7/2003 | Nishioka et al. | 370/216 |
| 2004/0078632 A1 * | 4/2004 | Infante et al. | 714/5 |
| 2004/0107300 A1 * | 6/2004 | Padmanabhan et al. | 710/1 |
| 2005/0097243 A1 * | 5/2005 | Yamashita et al. | 710/38 |
| 2006/0179188 A1 * | 8/2006 | Mimatsu et al. | 710/65 |
| 2006/0291378 A1 * | 12/2006 | Brotherston et al. | 370/221 |
| 2007/0055737 A1 * | 3/2007 | Yamashita et al. | 709/213 |
| 2009/0271541 A1 * | 10/2009 | Aoki et al. | 710/38 |
| 2014/0068121 A1 * | 3/2014 | Takakura et al. | 710/74 |

OTHER PUBLICATIONS

'Veritas Volume Manager Administrator's Guide 5.0,' copyright 2006 by Symantec Corporation, pp. 164-166 (full document can be found at http://docs.oracle.com/cd/E19668-01/875-3890-10/875-3890-10.pdf).*
'EMC PowerPath Family: PowerPath and PowerPath/VE Multipathing' Data Sheet, copyright 2002, 2011 by EMC Corporation.*

* cited by examiner

*Primary Examiner* — Steven Snyder
(74) *Attorney, Agent, or Firm* — BainwoodHuang

(57) ABSTRACT

A host computer accesses a storage volume via multiple paths and maintains path mode information identifying either an active or standby operating mode. An active-mode path is generally usable, and a standby-mode path is usable under exceptional conditions such as non-availability of an active-mode path. A reason identifier identifies a first operating condition causing the path to be placed in the standby mode. Upon a path-activating event for a standby-mode path, if there is a second operating condition indicating that the path should be maintained in the standby operating mode, then the path is maintained in the standby operating mode and the path mode information is set to identify the second operating condition, and otherwise the operating mode is set to active. A path-activating event can be a manual action by a user or automatic action such as expiration of an aging timer to re-attempt use of a standby path.

18 Claims, 3 Drawing Sheets

MANAGEMENT OF PATH OPERATING MODE TRANSITIONS IN MULTIPATHING HOST COMPUTER

BACKGROUND

The invention is directed to the field of data storage operations in data processing systems.

It is known to employ a technique referred to as "multipathing" in host computers performing storage operations to a storage system. When multiple distinct paths to a given storage volume are available to a host, the host selects from among the available paths for different storage commands being directed to the volume. Path selection is done to enhance performance by making full utilization of all paths and thereby achieving high utilization of storage resources and lower average latencies of storage operations. Thus paths may be selected based on an adaptive load balancing policy. Path selection may also be used to improve system availability of data on storage. For example, in the event that a desired path becomes unavailable, path selection may automatically select an alternative path.

In some systems, multipathing functionality is provided by a driver that processes storage commands directed to a storage system to which the host computer is connected. An example of such a multipathing driver is a driver sold under the name PowerPath® by EMC Corporation.

SUMMARY

In host computers employing multipathing, the paths and their utilization are generally managed in some way to promote system operational goals. Controls may be used to select between an active operating mode and an inactive or standby operating mode, where active-mode paths are used for I/O operations to the exclusion of standby-mode paths. The set of paths available for use can be controlled so that paths experiencing failures or low performance can be omitted from regular use, for example. Control mechanisms may be any mix of manual (user-directed) and automatic (performed by programmed action of the host software and/or hardware).

One aspect of system design and operation is a balance between comprehensiveness and simplicity or robustness. Comprehensiveness refers to the ability to detect and process as many expected operating conditions as possible, achieving a desired degree of optimality in overall system performance. For example, there may be several distinct conditions that may dictate that a path be placed in the standby mode, and a comprehensive design would detect and respond to all occurrences of all such conditions. Simplicity/robustness refers to the freedom from unnecessary complexity in the design and operation of a system. To the extent that detection and response are done in only one or a few ways or under only a few circumstances, rather than in a multitude of ways, a system will be easier to build, operate, maintain and enhance. In some cases, comprehensiveness and simplicity may be antagonistic, so it is desirable to strike an appropriate balance.

The present application is directed to a method of operating a host computer having access to a storage volume via two or more distinct paths. For each of the paths, path mode information is maintained that identifies an operating mode selected from an active mode and a standby mode. Each active-mode path is generally usable by the host computer to access the volume, and each standby-mode path is usable by the host computer to access the volume only under exceptional conditions in which none of the paths in the active operating mode is available for accessing the volume. The path mode information for each standby-mode path also includes a reason identifier identifying a first operating condition that caused the path to enter the standby operating mode. For example, a path may be identified as a non-preferred path to be avoided indefinitely, or it may have experienced failures that were potentially transitory.

Upon a path-activating event for a standby-mode path, generally the path will be set automatically to the active operating mode. However, if there is a second operating condition indicating that the path should be maintained in the standby operating mode, then the path is maintained in the standby operating mode and the path mode information is set to identify the second operating condition. An example of a path-activating event is a user's manual command to set a path to the active operating mode. In another example, a timer used to limit the duration of a standby operating mode may have expired, to bring the path back into the active operating mode and attempt to use it again.

In one embodiment, the second condition is a persistent condition such as the path having become non-preferred. Persistent conditions override moving a path to active mode because they are persistent. In general, a path is placed in the standby mode for the first condition detected (the trigger), which may be a transient condition. Since little or no I/O flows on the path after this, it is unlikely that another transient trigger would happen at this point, but if it does, then in one embodiment it may be discarded. On the other hand, when a persistent condition is detected, the information about that condition is stored for future use (as a new path comes along, for instance). So when an auto-standby mode for a transient reason is aged out or manually cleared, then if a persistent reason exists it causes a transition to auto-standby by reason of the persistent trigger having been previously found and stored.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

The following pending US patent applications are incorporated herein by reference in their entirety:

1. Identification And Use Of Preferred Path Groups In Host Computer Based On Differential Performance, U.S. patent application Ser. No. 13/339,693
2. Techniques Involving Flaky Path Detection, U.S. patent application Ser. No. 13/339,669

Figure 1:
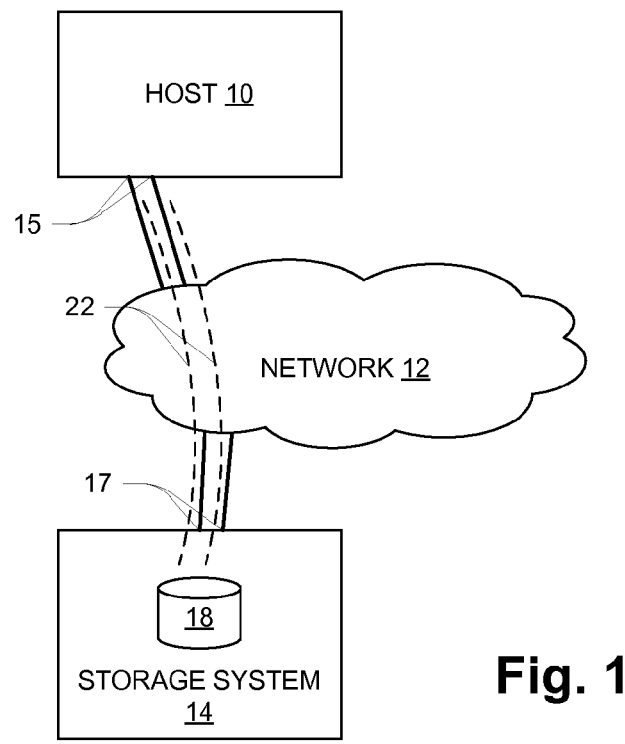
FIG. 1 is a block diagram of a data processing system.

FIG. 1 shows a data processing system having a host computer (HOST) 10, a storage interconnection network (NW) 12 and a storage system 14. In general, both the host 10 and storage system 14 have multiple connections to the network 12 via respective ports 15, 17. An end-to-end connection between a host port 15 and storage system port 17 may be referred to herein as a "bus" for carrying storage commands and data. The storage system 14 presents to the host 10 one or more addressable units of storage referred to as "volumes" or "LUNs" 18 ("LUN" referring in a strict sense to SCSI logical unit number, but generally used to refer to the logical unit of storage itself).

"Storage system" refers to one or more manufactured assemblies providing access to associated physical storage. Each assembly might contain physical storage elements such as disk drives, or in some cases there may be some assemblies that serve as a front end to associated physical storage residing on one or more separate back end assemblies. One type of storage system, referred to as an "array", has a collection of disk drives along with control circuitry providing host interface(s) and other functions. An example of an array is a SAN- or NAS-based system sold under the name VNX™ by EMC Corporation. An example of an appliance serving as a front end to separate back-end physical storage is a storage controller appliance sold under the name VPLEX™ by EMC Corporation.

Illustrated in FIG. 1 are multiple paths 22 extending between the host 10 and the LUN 18. A path in the present context may be a so-called I-T-L nexus, referring to a particular Initiator port (host port 15), Target port (storage system port 17) and LUN (LUN 18). The paths 22 are distinct in that they have different host ports 15 and storage system ports 17. In general, the host 10 can conduct storage input/output (I/O) operations involving the LUN 18 via any of the paths 22. More information about the management and use of the paths 22 is provided below.

FIG. 1 depicts a simplified system for purposes of description. In actual implementation, a data processing system may resemble that of FIG. 1 or it may be more extensive and complex. In particular, a system may have multiple hosts 10 and multiple storage systems 14 and potentially employ a complex set of network elements to realize the network 12. In some systems, a LUN 18 may be accessible at multiple physical locations via distinct storage assemblies, buses and paths. Additionally, in a real system there will typically be a number of different LUNs accessible to the host.

Figure 2:
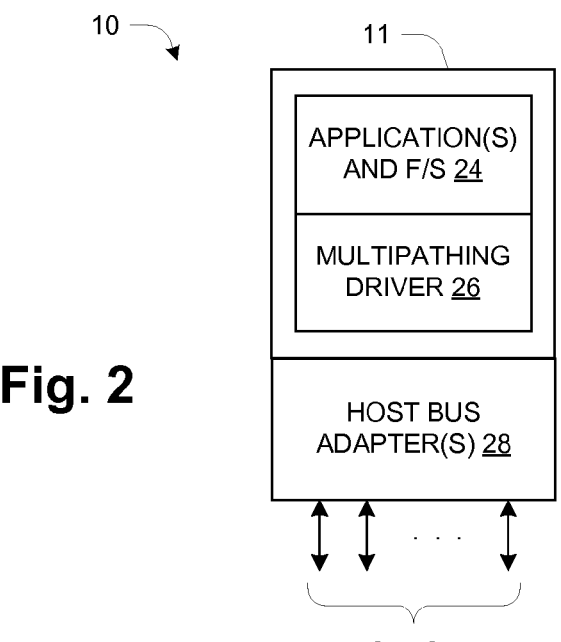
FIG. 2 is a block diagram of a host computer.

FIG. 2 shows pertinent structure and organization of the host 10. It will be appreciated that from a hardware perspective the host 10 is a computer including processing circuitry 11 such as one or more processors, memory, and input/output circuitry along with internal data bus(es) interconnecting these components (not shown in FIG. 2). The processing circuitry 11 stores and executes computer instructions that form various programs, routines, etc., including an operating system and one or more application programs for example. FIG. 2 illustrates executing application program(s) (generally in user space) and file system(s) (F/S) 24 (generally in kernel) as well as an executing multipathing driver 26 used in the processing of storage I/O operations. The host 10 also includes a host bus adapter(s) or HBA(s) 28 which include(s) hardware circuitry that interfaces the host 10 to the network 12 via the host port(s) 15. The host 10 may have one or more HBAs 28, and each HBA 28 may have one or more ports 15.

The multipathing driver 26 typically forms part of an operating system of the host 10. It may be part of a set of drivers that together process the storage I/O commands from the applications and file system 24 directed to the storage system 14. As an example, it may be used with a SCSI class driver and an HBA driver. In such an arrangement the multipathing driver 26 may be realized as a so-called "filter" driver that performs special processing for storage I/O commands. The term "multipathing" refers to functionality of identifying, using and managing the various paths to storage volumes (e.g., paths 22 to volume/LUN 18) to effect system goals while hiding details of these operations from the application(s) and file system 24, as described in more detail below. System goals can include performance goals (from the use of parallel operations over multiple paths 22), availability goals (from the use of redundancy and fail-over techniques), etc.

Figure 3:
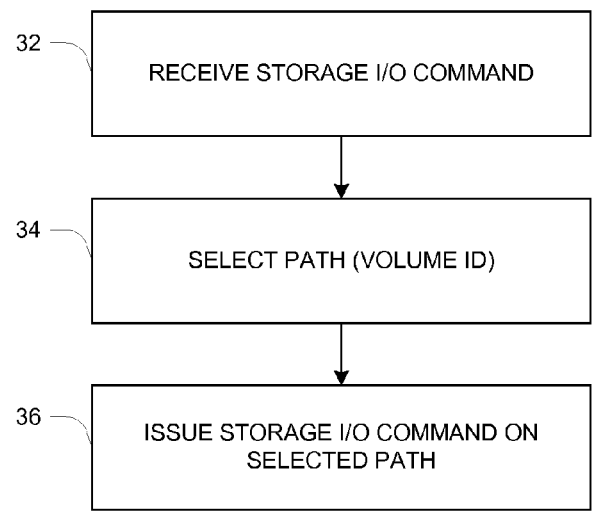
FIG. 3 is a flow diagram for processing of a storage I/O command.

FIG. 3 illustrates basic operation of the multipathing driver 26 when processing a storage I/O command. At 32, it receives the storage I/O command (such as a read data or write data command) for a storage operation being performed by the application(s) or F/S 24. The storage I/O command will typically be included in an I/O command block passed from a higher level component of the operating system to the multipathing driver 26, as generally known in the art. The storage I/O command will include, among other things, an identification of the volume to which the storage operation is directed, such as volume 18.

At 34, the multipathing driver 26 selects a path that is to be used for the storage I/O command, based on the identification (VOLUME ID) of the volume. In the case of volume 18, selection may be from among the paths 22 as shown in FIG. 1, subject to consideration of path operating modes as explained below. Path selection provides load balancing across the set of paths to a volume, and continued availability of the volume in the event of failure of a path.

At 36, the multipathing driver 26 issues the storage I/O command on the selected path. Again referring to an example I/O command directed to volume 18, the command will be sent to the storage system 14 via a selected one of the paths 22. The selected path will also be used for the data transfer associated with the I/O command, as well as the eventual response indicating completion of the I/O command, as generally known in the art.

Figure 4:
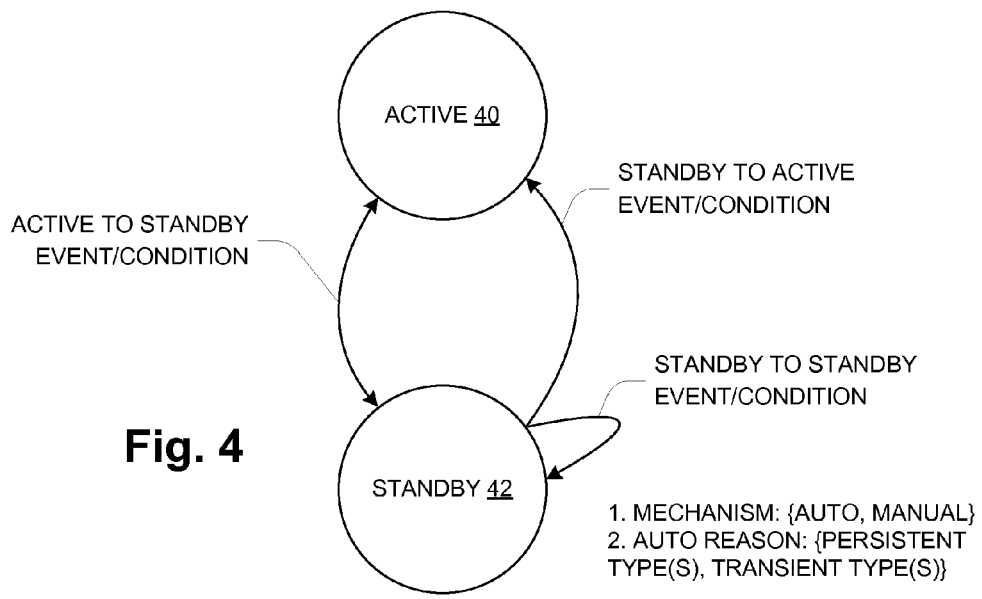
FIGS. 4 and 5 are state diagrams describing transitions of path mode.

FIG. 4 illustrates a set of operating modes that can apply to an individual path 22, along with an indication of conditions for transitions between the modes. Each path 22 is in either an active operating mode ("active mode") 40 or a standby operating mode ("standby mode") 42. Paths in the active mode 40 are more generally used during the above-mentioned path selection than paths in the standby mode 42. Paths in the standby mode 42 are selected for use only under more restrictive circumstances. For example, a path in the standby mode 42 may be selected for use for an I/O command if there are no paths to the target volume that are in the active mode 40. This could occur, for example, if each active-mode path to the target volume experienced a failure.

Associated with the standby mode 42 is additional path mode information describing how a path was placed in the standby mode 42. Two types of information are indicated. Mechanism information identifies whether the standby mode 42 was entered automatically (AUTO) or manually (MANUAL). An example of a manual mechanism is action of a user such as a storage administrator via a management interface to the driver 26. Automatic action is generally programmed action of the driver 26 based on events or conditions encountered during operation, as more fully described below. Along with the mechanism information is "reason" information describing an event or condition that caused the path to be placed into standby 42 automatically. As previously indicated, reasons may be of two general types, persistent and transient. The significance and use of the mechanism and reason information, along with examples, are described below.

Further with respect to the manual mechanism, a manual setting of path operating mode is achieved by a user issuing a command which is interpreted and acted on by the driver 26 to directly set the path operating mode to either active 40 or standby 42 as dictated by the command. For example, if an administrative user becomes aware of a reason that a path should preferably not be used, the user may manually place the path into the standby mode 42. When this has occurred, the path can only be placed back into the active mode 40 by another manual operation—the multipathing driver 26 does not override this manual setting.

At a high level, the operating mode of a path changes or transitions in response to events and/or conditions occurring during operation of the host 10. Three types of transitions are shown in FIG. 4: (1) Active 40 to Standby 42, (2) Standby 42 to Active 40, and (3) Standby 42 to Standby 42. Although the Standby 42 to Standby 42 transition does not change the operating mode per se (the path remains in Standby mode 42), it does change the mechanism and/or reason information and have other consequences, and therefore is specifically identified and described herein.

Transient reasons or conditions are those which may change dynamically during operation and therefore merit periodic reassessment. An example of a transient reason for placing a path into the standby mode 42 is intermittence in the functioning of the path, indicated for example by the failure of some fraction of I/O commands using the path over some period. Such a path might also be termed a "flaky path", as described in the above-referenced U.S. application Ser. No. 13/339,669. An example of a path-specific condition that might cause an I/O command to fail is a poor-quality cable connection or similar intermittent hardware malfunction. When such a flaky path is detected, it may be preferable to place the path in Standby mode 42 where it will be excluded from normal path selection (assuming at least one other path to the target LUN is available), rather than continue to operate with occurrence of I/O command failures and their disruptive effects. However, it may also be useful to periodically attempt to use the path again to test whether the malfunctioning has been corrected, for example due to an intervening service operation or other remedial mechanism. Thus, the driver 26 may use an aging counter or similar mechanism to limit the duration of the Standby mode 42, then automatically return the path to the Active mode 40 where it is again used in normal path selection.

Persistent reasons are those that are expected to remain indefinitely and generally to change rarely, and thus may not merit any time-based reassessment as described above. One example of a persistent reason for a path to be placed in the Standby mode 42 is low performance relative to other available paths to the target LUN. As mentioned above, a LUN may be accessible to a host using different paths that extend through different physical locations, and these paths may have different amounts of average delay or latency due to these location differences. Other reasons for differential performance might include persistent differences in available bandwidth, etc. More generally, there may be any of a variety of reasons why a path is not preferred for use. When such conditions exist, it may be desirable to place such a non-preferred path into the Standby mode 42 so that it is not included in normal path selection (which presumably includes only preferred available path(s)). The path is usable and may be activated if necessary, but absent some special circumstances it is not to be used, indefinitely.

The operating modes of the paths 22 may or may not persist across a re-booting of the host 10 or re-starting of the multipathing driver 26. In many cases it will be desirable for manual settings to persist. It may be desirable for automatic settings to be recalculated. If a path has been set to the standby mode 42 by the driver 26, then upon a re-start the path may initially be in the active mode 40 by default. The driver 26 will typically go through a process to identify preferred and non-preferred paths and set the operating modes of the paths accordingly. Note that the system may include an administrator-controlled "enable" that controls whether or not such a process occurs during initialization. If such an enable control is used, it is preferable that its value persist across re-starts.

The following is a table describing the events or conditions for the three types of transitions shown in FIG. 4:

1. Active to Standby
   a. Manual
   b. Auto—persistent condition (e.g., has become not preferred)
   c. Auto—transient condition (e.g., flaky path detected)
2. Standby to Active
   a. Manual (with conditions—see text below)
   b. Auto—removal of persistent condition (e.g., has become preferred)
   c. Auto—transient condition aging timer expired and no persistent condition exists indicating path should be maintained in standby mode
3. Standby to Standby
   a. Manual
   b. Auto—transient condition aging timer expired and persistent condition exists indicating path should be maintained in standby mode (e.g., not preferred)

For each transition by manual action, the new path mode information reflects the new operating mode (Active or Standby) as well as the "manual" mechanism.

For each transition by automatic action, the new path mode information reflects the new operating mode (Active or Standby), the "automatic" mechanism, and the reason that automatic action was taken, with the reason having either a persistent or transient characteristic. For example, transition 1(b) occurs by automatic action when a path has become a non-preferred path. The new path mode information includes reason information indicating that the path was placed in Standby mode 42 because it is non-preferred.

A path that is set manually to Active mode 40 can be transitioned to Standby mode 42 either manually or automatically. An automatic mechanism cannot override a manual action that places a path into Standby mode 42.

Figure 5:
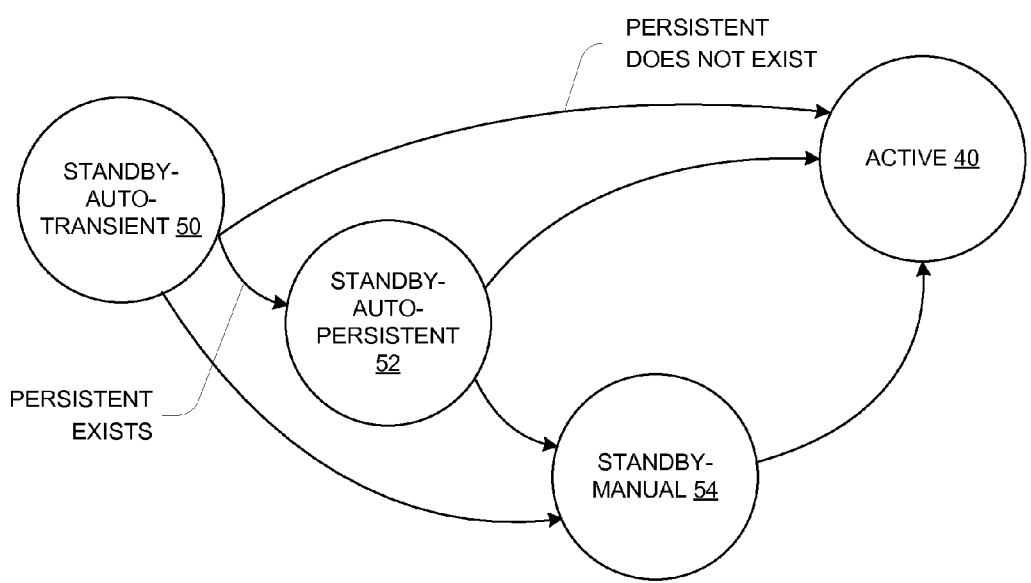

FIG. 5 illustrates a subset of transitions of path operating modes and path mode information. Specifically, the Standby to Active and Standby to Standby transitions are shown. The Standby mode 42 is divided into three distinct sub-modes. In the Standby-Auto-Transient mode 52, the path is in Standby mode 42 by automatic action based on a transient reason, such as detection of intermittent failures as described above. In the Standby-Auto-Persistent mode 50, the path is in the Standby mode 42 by automatic action based on a persistent reason, such as its being identified as not preferred. In the Standby-Manual mode 54, the path is in the Standby mode 42 by manual action.

FIG. 5 shows transitions that are all described by the above table and description, and illustrates with particular emphasis the transitions out of the Standby-Auto-Transient mode 50. Generally, there are two mechanisms for these transitions—either manual action, or automatic action when an aging timer for a previously detected transient condition has expired. These mechanisms may be referred to as "path-activating" actions or events, transitioning the path into Active mode 40 if possible. However, as shown operation at this point depends on whether a persistent condition exists that should cause the path to remain in the Standby mode 42. If so, then the path remains in Standby mode 42 and transitions to the Standby-Auto-Persistent mode 52. If no such persistent condition exists, then the operating mode of the path transitions to the Active mode 40.

A subtle aspect of the operation shown in FIG. 5 is that a persistent condition causing transition to the Standby-Auto-Persistent mode 52 has come into existence while the path was in the Standby-Auto-Transient mode 50 (otherwise the path would already be in the Standby-Auto-Persistent mode 52). The persistent condition may have been detected at any time while the path was in the Standby-Auto-Transient mode 50, and at the time of detection it is recorded. At a later time of transition out of the Standby-Auto-Transient mode 50, the recorded persistent condition causes transition to Standby-Auto-Persistent mode 52 rather than to Active mode 40.

Another subtlety of the operation of FIG. 5 is a case of automatic action overriding manual action when the transition out of the Standby-Auto-Transient mode 50 is user-initiated. In this case, the path mode is transitioned to Standby-Auto-Persistent mode 52 even though the user has commanded that the path transition to Active mode 40. In the illustrated embodiment, if the user wants to force the path into the active mode 40, he/she could issue a second manual command. This will be effective because the path mode is now Standby-Auto-Persistent 52 which can be overridden by a manual activation. In alternative embodiments this user-visible aspect of operation may be handled differently. For example, the user may be warned that a persistent condition for maintaining the path in Standby mode 42 exists, and given an explicit option of either proceeding to the Active mode 40 or proceeding to the Standby-Auto-Persistent mode 52.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a host computer having access to a storage volume via two or more distinct paths, comprising:

for each of the paths, maintaining path mode information identifying an operating mode selected from an active mode and a standby mode, each active-mode path being usable by the host computer to access the volume, each standby-mode path being usable by the host computer to access the volume under exceptional conditions in which none of the paths in the active operating mode is available for accessing the volume, the path mode information for each standby-mode path also including a reason identifier identifying a first operating condition that caused the path to enter the standby operating mode; and upon occurrence of a path-activating event when a path is in the standby operating mode, if there is a second operating condition indicating that the path should be maintained in the standby operating mode, then maintaining the path in the standby operating mode and setting the path mode information to identify the second operating condition, and otherwise setting the operating mode of the path to the active operating mode, wherein a set of operating conditions for causing a path to be in the standby operating mode are divided into persistent conditions and transient conditions, persistent conditions generally lasting over a longer time period than transient conditions, and wherein the second operating condition is a persistent condition, and wherein:

a path is placed into the standby mode from the active mode by automatic action for the persistent conditions and for the transient conditions, the automatic action being a programmed response of the host computer;

the path can be placed into the standby mode and into the active mode by manual action of a user of the host computer via a user interface;

the path activating event is a manual action commanding that the path be placed in the active mode; and the path is maintained in the standby operating mode with the path mode information identifying the second operating condition notwithstanding that the manual action commands that the path be placed in the active mode.

2. A method according to claim 1, wherein the persistent conditions include an identification of the path as usable but not preferred for use, and the transient conditions include an identification of the path as a flaky path experiencing an undesirably high failure rate for input/output commands carried by the path.

3. A method according to claim 2, wherein the paths include a plurality of sets of paths, each set extending to the volume via a respective distinct location, one or more locations being more remote from the host computer than other locations, and wherein the identification of the path as not preferred for use is based on an identification of the path as extending to the volume via one of the more remote locations.

4. A method according to claim 3, wherein the identification of the path as extending to the volume via one of the more remote locations is based on a lower performance for input/output commands carried by the path relative to input/output commands carried by other paths to the storage volume.

5. A method according to claim 2, wherein the identification of the path as a flaky path is based on a count of total input/output commands per failure of a predetermined number of input/output commands.

6. A method according to claim 1, wherein:

the path can be placed into the active mode from the standby mode by further automatic action when the preceding condition is a transient condition, the further automatic action occurring to enable a determination of whether the transient condition no longer exists;

the path activating event is a first-type path activating event; and a second-type path activating event is the further automatic action.

7. A method according to claim 6, wherein the manual action includes a forcing indicator indicating that the path should be taken out of the standby mode notwithstanding that the path was placed in the standby operating mode by previous automatic action, and wherein the path is left in the standby mode if the forcing indicator is omitted from the manual action.

8. A method according to claim 7, wherein, in the event the path is maintained in the standby mode due to the existence of the second operating condition, a second manual action also including the forcing indicator is required to place the path into the active mode.

9. A method according to claim 6, wherein the further automatic action includes expiration of an aging timer used to measure a predetermined time for maintaining the path in the standby mode after detection of the transient condition.

10. A host computer having access to a storage volume via two or more distinct paths, comprising:

one or more processors;

memory storing computer program instructions of a storage driver program;

interface circuitry for connecting the host computer to external devices including devices providing the paths to the storage volume; and interconnect circuitry coupling the processors, memory and interface circuitry together, the processors being operative to execute the instructions of the storage driver program to cause the host computer to perform a method including:

for each of the paths, maintaining path mode information identifying an operating mode selected from an active mode and a standby mode, each active-mode path being usable by the host computer to access the volume, each standby-mode path being usable by the host computer to access the volume under exceptional conditions in which none of the paths in the active operating mode is available for accessing the volume, the path mode information for each standby-mode path also including a reason identifier identifying a first operating condition that caused the path to enter the standby operating mode; and upon occurrence of a path-activating event when a path is in the standby operating mode, if there is a second operating condition indicating that the path should be maintained in the standby operating mode, then maintaining the path in the standby operating mode and setting the path mode information to identify the second operating condition, and otherwise setting the operating mode of the path to the active operating mode, wherein a set of operating conditions for causing a path to be in the standby operating mode are divided into persistent conditions and transient conditions, persistent conditions generally lasting over a longer time period than transient conditions, and wherein the second operating condition is a persistent condition, and wherein:

a path is placed into the standby mode from the active mode by automatic action for the persistent conditions and for the transient conditions, the automatic action being a programmed response of the host computer;

the path can be placed into the standby mode and into the active mode by manual action of a user of the host computer via a user interface;

the path activating event is a manual action commanding that the path be placed in the active mode; and the path is maintained in the standby operating mode with the path mode information identifying the second operating condition notwithstanding that the manual action commands that the path be placed in the active mode.

11. A host computer according to claim 10, wherein the persistent conditions include an identification of the path as usable but not preferred for use, and the transient conditions include an identification of the path as a flaky path experiencing an undesirably high failure rate for input/output commands carried by the path.

12. A host computer according to claim 11, wherein the paths include a plurality of sets of paths, each set extending to the volume via a respective distinct location, one or more locations being more remote from the host computer than other locations, and wherein the identification of the path as not preferred for use is based on an identification of the path as extending to the volume via one of the more remote locations.

13. A host computer according to claim 12, wherein the identification of the path as extending to the volume via one of the more remote locations is based on a lower performance for input/output commands carried by the path relative to input/output commands carried by other paths to the storage volume.

14. A host computer according to claim 11, wherein the identification of the path as a flaky path is based on a count of total input/output commands per failure of a predetermined number of input/output commands.

15. A host computer according to claim 10, wherein:

the path can be placed into the active mode from the standby mode by further automatic action when the preceding condition is a transient condition, the further automatic action occurring to enable a determination of whether the transient condition no longer exists;

the path activating event is a first-type path activating event; and a second-type path activating event is the further automatic action.

16. A host computer according to claim 15, wherein the manual action includes a forcing indicator indicating that the path should be taken out of the standby mode notwithstanding that the path was placed in the standby operating mode by previous automatic action, and wherein the path is left in the standby mode if the forcing indicator is omitted from the manual action.

17. A host computer according to claim 16, wherein, in the event the path is maintained in the standby mode due to the existence of the second operating condition, a second manual action also including the forcing indicator is required to place the path into the active mode.

18. A host computer according to claim 15, wherein the further automatic action includes expiration of an aging timer used to measure a predetermined time for maintaining the path in the standby mode after detection of the transient condition.

* * * * *